(12) United States Patent
Peter et al.

(10) Patent No.: US 10,476,774 B2
(45) Date of Patent: Nov. 12, 2019

(54) SELECTIVE TRANSMISSION OF BIDIRECTIONAL FORWARDING DETECTION (BFD) MESSAGES FOR VERIFYING MULTICAST CONNECTIVITY

(71) Applicant: Juniper Networks, Inc., Sunnyvale, CA (US)

(72) Inventors: Anish Peter, Bangalore (IN); Raj Chetan Boddireddy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 50 days.

(21) Appl. No.: 15/252,905

(22) Filed: Aug. 31, 2016

(65) Prior Publication Data

US 2018/0062966 A1    Mar. 1, 2018

(51) Int. Cl.
*H04L 12/26* (2006.01)
*H04L 12/927* (2013.01)
(Continued)

(52) U.S. Cl.
CPC .......... *H04L 43/10* (2013.01); *H04L 12/1868* (2013.01); *H04L 47/806* (2013.01); *H04L 49/3009* (2013.01)

(58) Field of Classification Search
CPC ......... H04L 43/50; H04L 45/58; H04L 45/74; H04L 45/745; H04L 12/1868; H04L 43/10; H04L 47/806; H04L 49/3009
See application file for complete search history.

(56) References Cited

U.S. PATENT DOCUMENTS 6,331,983 B1 * 12/2001 Haggerty .............. H04L 12/185
                                                    370/400
8,385,215 B1 *  2/2013 Florit ..................... H04L 43/50
                                                    370/248
(Continued)

FOREIGN PATENT DOCUMENTS

EP    2383934 A1    11/2011
EP    3059910 A1     8/2016

OTHER PUBLICATIONS

Extended European Search report corresponding to EP 16 20 7418, dated Jul. 20, 2017, 7 pages.
(Continued)

*Primary Examiner* — Michael Thier
*Assistant Examiner* — Prince A Mensah
(74) *Attorney, Agent, or Firm* — Harrity & Harrity, LLP (57) ABSTRACT

A network device may identify first interfaces used by the network device to communicate with other network devices. The network device may use second interfaces to communicate with multicast receiver devices that are different from the other network devices. The network device may store information that identifies the first interfaces used to communicate with the other network devices. The network device may receive a packet, and may determine that the packet includes a bidirectional forwarding detection message, associated with a bidirectional forwarding detection protocol, to be used to verify multicast connectivity with a multicast source device. The network device may identify the first interfaces based on the stored information and based on determining that the packet includes the bidirectional forwarding detection message, and may transmit the packet via the first interfaces without transmitting the packet via the second interfaces.

20 Claims, 5 Drawing Sheets

(51) Int. Cl.
*H04L 12/935* (2013.01)
*H04L 12/18* (2006.01)

(56) References Cited

U.S. PATENT DOCUMENTS

| | | | | |
|---|---|---|---|---|
| 8,953,460 | B1* | 2/2015 | Addepalli | H04L 43/10 370/241 |
| 9,497,107 | B1* | 11/2016 | Akiya | H04L 45/22 |
| 2009/0245248 | A1* | 10/2009 | Arberg | H04L 12/185 370/390 |
| 2011/0066735 | A1* | 3/2011 | Vinokour | G06F 15/16 709/227 |
| 2014/0198794 | A1* | 7/2014 | Mehta | H04L 45/74 370/392 |
| 2015/0188814 | A1* | 7/2015 | Jain | H04L 45/74 370/392 |
| 2016/0308752 | A1* | 10/2016 | Hu | H04L 45/58 |
| 2017/0012876 | A1* | 1/2017 | Bamford | H04L 45/745 |
| 2017/0257260 | A1* | 9/2017 | Govindan | H04L 12/4633 |

OTHER PUBLICATIONS

Katz et al., "BFD for Multipoint Networks," https://tools.ietf.org/html/draft-ietf-bfd-multipoint-08, Apr. 12, 2016, 18 pages.
Cisco, "IP Multicast Technology Overview," http://www.cisco.com/c/en/us/td/docs/ios/solutions_docs/ip_multicast/White_papers/mcst_ovr.html#wp998638, Apr. 18, 2002, 24 pages.

* cited by examiner

SELECTIVE TRANSMISSION OF BIDIRECTIONAL FORWARDING DETECTION (BFD) MESSAGES FOR VERIFYING MULTICAST CONNECTIVITY

BACKGROUND

The bidirectional forwarding detection (BFD) protocol is a mechanism that detects failures in a network. Packets are sent at a specified, regular interval. A network failure is detected when a transmitting device stops receiving a reply from a receiving device, after a specified interval, for example.

SUMMARY

According to some possible implementations, a network device may identify one or more first interfaces used by the network device to communicate with one or more other network devices. The network device may use one or more second interfaces to communicate with one or more multicast receiver devices that are different from the one or more other network devices. The network device may store information that identifies the one or more first interfaces used to communicate with the one or more other network devices. The network device may receive a packet, and may determine that the packet includes a bidirectional forwarding detection message, associated with a bidirectional forwarding detection protocol, to be used to verify multicast connectivity with a multicast source device. The network device may identify the one or more first interfaces based on the stored information and based on determining that the packet includes the bidirectional forwarding detection message, and may transmit the packet via the one or more first interfaces without transmitting the packet via the one or more second interfaces.

According to some possible implementations, a non-transitory computer-readable medium may store one or more instructions that, when executed by one or more processors, cause the one or more processors to identify one or more first interfaces used by a network device to communicate with one or more other network devices. The network device may use one or more second interfaces to communicate with one or more multicast receiver devices that are different from the one or more other network devices. The one or more instructions may cause the one or more processors to store information that identifies the one or more first interfaces used to communicate with the one or more other network devices. The one or more instructions may cause the one or more processors to determine that a packet includes a bidirectional forwarding detection message, associated with a bidirectional forwarding detection protocol, to be used to verify multicast connectivity with a multicast source device. The one or more instructions may cause the one or more processors to transmit, based on the stored information, the packet via the one or more first interfaces without transmitting the packet via the one or more second interfaces.

According to some possible implementations, a method may include receiving, by a first network device, a packet, and determining, by the first network device, that the packet includes a bidirectional forwarding detection message, associated with a bidirectional forwarding detection protocol, to be used to verify multicast connectivity with a multicast source device. The method may include identifying, by the first network device, one or more first interfaces based on determining that the packet includes the bidirectional forwarding detection message. The one or more first interfaces may be used by the first network device to communicate with one or more second network devices. The one or more first interfaces may be different from one or more second interfaces to be used by the first network device to communicate with one or more multicast receiver devices that are different from the one or more second network devices. The method may include transmitting, by the first network device and based on identifying the one or more first interfaces, the packet via the one or more first interfaces without transmitting the packet via the one or more second interfaces.

DETAILED DESCRIPTION

The following detailed description of example implementations refers to the accompanying drawings. The same reference numbers in different drawings may identify the same or similar elements.

A network device, such as a router or a switch, may use the bidirectional forwarding detection (BFD) protocol to verify multicast (e.g., point to multipoint) connectivity between a multicast source and one or more multicast receivers. When using the bidirectional forwarding detection protocol, network devices receive and/or transmit bidirectional forwarding detection control messages to assist with verifying multicast connectivity between the network devices.

If a network device transmits a bidirectional forwarding detection message to another network device, the other network device may be able to process the bidirectional forwarding detection message. However, if the network device transmits a bidirectional forwarding detection message to a multicast receiver, such as a media player, a set-top-box, a computer, or the like, the multicast receiver may not be able to process the bidirectional forwarding detection message. This may cause processing errors, network errors, interruption of the multicast stream, or the like. For example, the multicast receiver might drop the bidirectional forwarding detection message and/or send a message to the transmitting network device indicating that the multicast receiver is not reachable.

Implementations described herein permit a network device to differentiate between router-facing interfaces of the network device, which connect to other network devices, and receiver-facing interfaces of the network device, which connect to receiver devices. In this way, the network device may selectively route bidirectional forwarding detection messages to network devices and not to receiver devices. The selective routing of bidirectional forwarding detection messages may reduce processing errors, network errors, and multicast transmission errors.

Figure 1A:
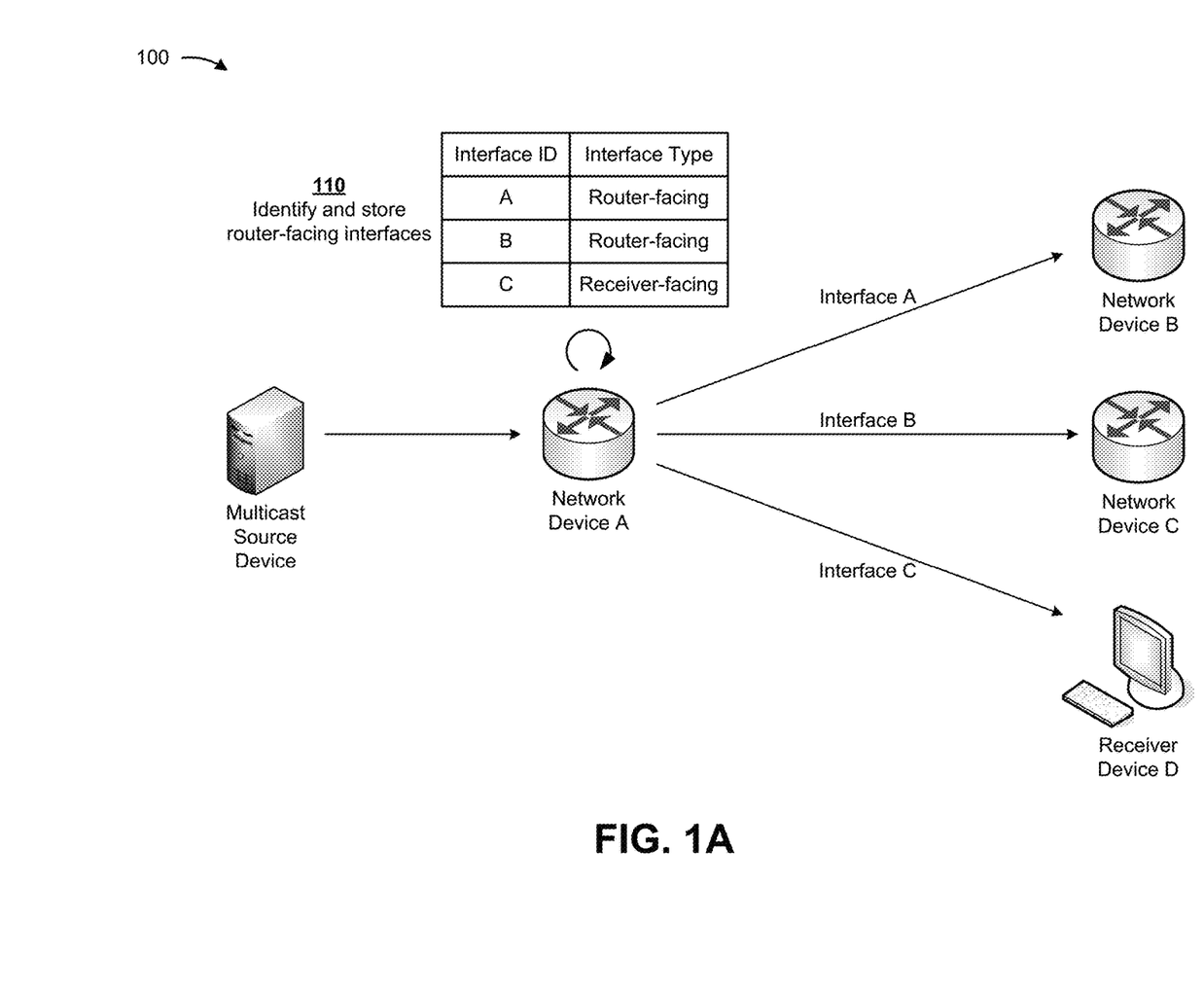
FIGS. 1A and 1B are diagrams of an overview of an example implementation described herein.
Figure 1B:
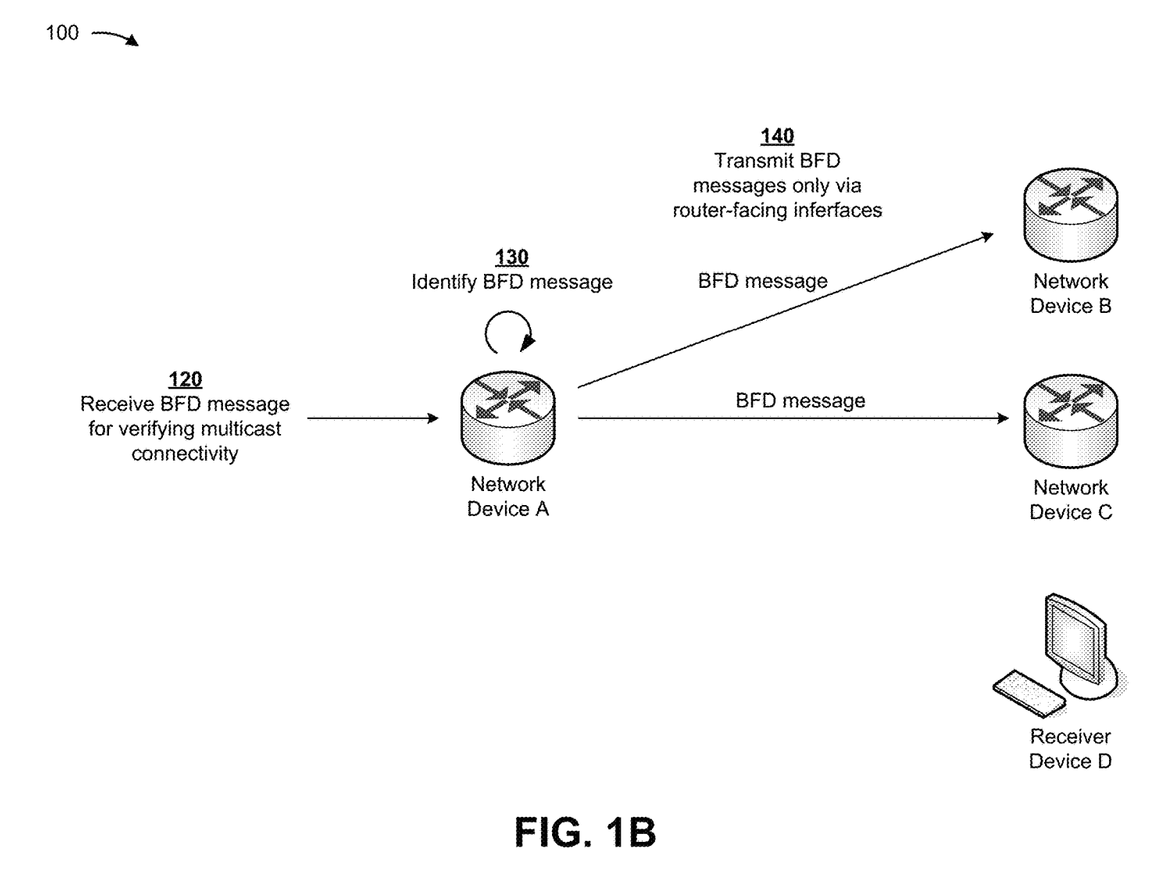

FIGS. 1A and 1B are diagrams of an overview of an example implementation 100 described herein. Example implementation 100 includes a multicast source device, a network device A, a network device B, a network device C, and a receiver device D. Network device A includes an interface A coupled to network device B, an interface B coupled to network device C, and an interface C coupled to receiver device D. Network device A may receive multicast traffic via the multicast source device.

In some implementations, and as shown by reference number 110, network device A may identify and store router-facing interfaces. For example, network device A may identify one or more first interfaces (e.g., interface A and/or interface B) used by network device A to communicate with one or more other network devices (e.g., network device B and/or network device C). Additionally, or alternatively, network device A may identify one or more second interfaces (e.g., interface C) used by network device A to communicate with one or more multicast receiver devices (e.g., receiver device D).

Network device A may store information that identifies router-facing interfaces (e.g., interface A and interface B) in a list or another type of data structure. The list may include information associated with interfaces via which network device A is to transmit multicast traffic. For example, the list may include information that identifies the type of interface. For example, the list shown in FIG. 1A includes interface identifiers (ID) A, B, and C, with corresponding interface types of router-facing, router-facing, and receiver-facing, respectively.

In some implementations, the information identifying the router-facing interfaces (e.g., interface A and interface B) may be used when network device A receives a bidirectional forwarding detection message in order to verify multicast connectivity. Network device A may transmit the bidirectional forwarding detection message via the router-facing interfaces (e.g., interface A and interface B), and may prevent the bidirectional forwarding detection message from being transmitted via receiver-facing interfaces (e.g., interface C).

As shown in FIG. 1B, and by reference number 120, network device A may receive a bidirectional forwarding detection message in order to verify multicast connectivity, with network devices B and C, for example. As shown by reference number 130, network device A may identify the message as a bidirectional forwarding detection message using one or more techniques described in more detail elsewhere herein.

As shown by reference number 140, based on identifying the bidirectional forwarding detection message, network device A may transmit the bidirectional forwarding detection message only via router-facing interfaces. For example, network device A may transmit the bidirectional forwarding detection message only to network device B via interface A and to network device C via interface B. In this way, network device A may prevent the bidirectional forwarding detection message from being transmitted via receiver-facing interfaces, to receiver device D, for example. This selective routing of bidirectional forwarding detection messages may reduce processing errors, network errors, and multicast transmission errors.

As indicated above, FIGS. 1A and 1B are provided merely as an example. Other examples are possible and may differ from what was described with regard to FIGS. 1A and 1B.

Figure 2:
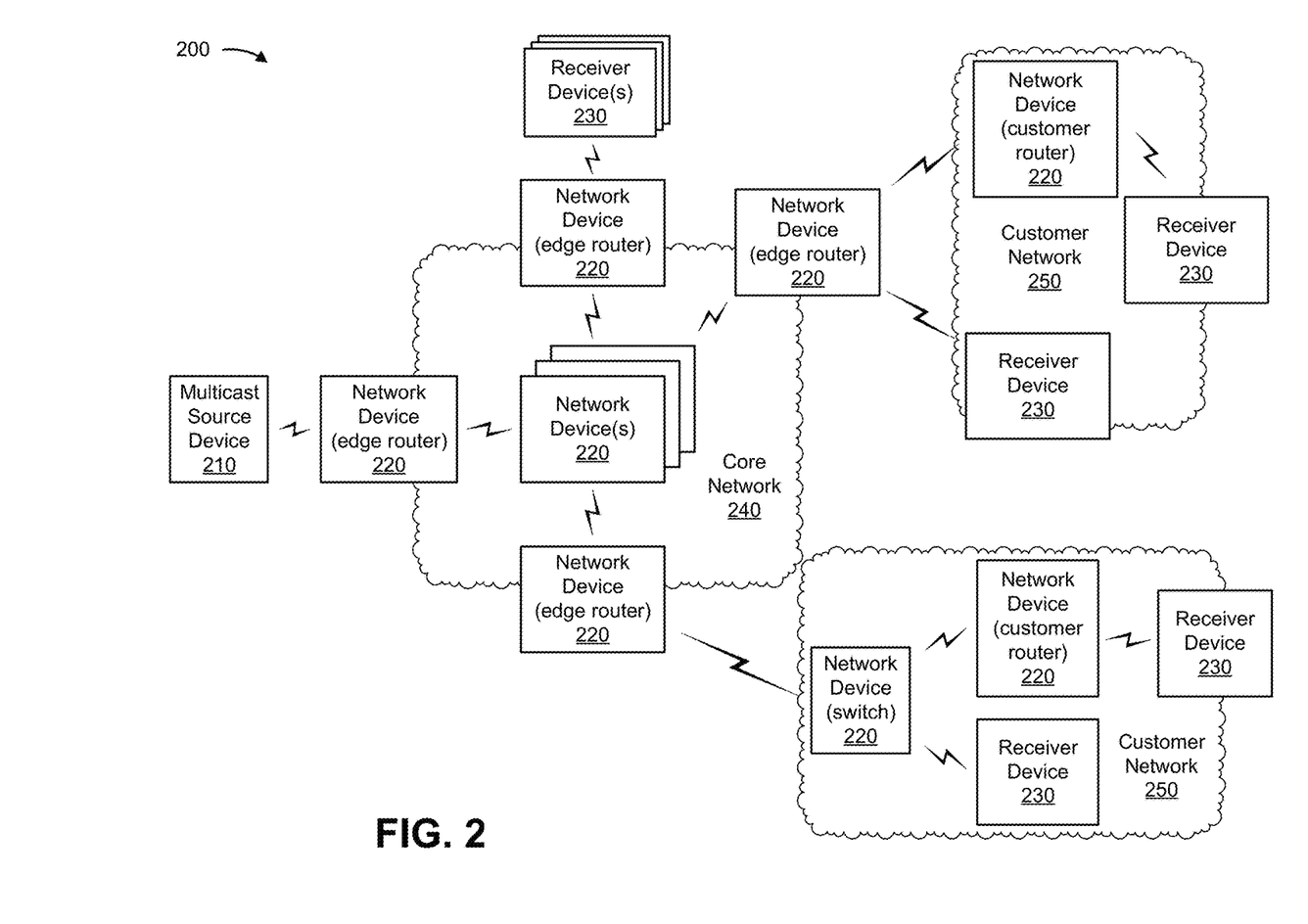
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a multicast source device 210, one or more network devices 220, one or more receiver devices 230, a core network 240, and one or more customer networks 250.

Devices of environment 200 may interconnect via wired connections, wireless connections, or a combination of wired and wireless connections.

Multicast source device 210 includes one or more devices that are a source for multicast traffic. For example, multicast source device 210 may include a server (e.g., a content server, a host server, etc.) or another type of device capable of acting as a source for multicast traffic. In some implementations, multicast source device 210 may generate multicast traffic and/or transmit multicast traffic, via one or more network devices 220, to one or more receiver devices 230 that are subscribed to receive the multicast traffic.

Network device 220 includes one or more devices (e.g., one or more traffic transfer devices) capable of processing and/or transferring traffic between multicast source device 210 and one or more receiver devices 230. For example, network device 220 may include a router, a switch, a gateway, a hub, a bridge, a reverse proxy, a server (e.g., a proxy server), a security device, an intrusion detection device, a load balancer, a firewall, or a similar device. In some implementations, network device 220 may include an edge router capable of routing traffic from core network 240 to customer network 250.

In some implementations, network device 220 may be positioned and/or configured to route traffic only to one or more receiver devices 230. In some implementations, network device 220 may be positioned and/or configured to route traffic only to one or more other network devices 220 (e.g., in core network 240 and/or customer network 250). In some implementations, network device 220 may be connected to one or more other network devices 220 via router-facing interface(s), and may be connected to one or more receiver devices 230 via receiver-facing interface(s).

Receiver device 230 includes one or more devices capable of receiving multicast traffic. For example, receiver device 230 may include a computing device, such as a laptop computer, a tablet computer, a handheld computer, a desktop computer, a mobile phone (e.g., a smart phone, a radiotelephone, etc.), a set-top box, a gaming console, or the like. In some implementations, receiver device 230 may subscribe to a multicast stream from multicast source device 210, and may receive the multicast stream via one or more network devices 220.

Core network 240 may include one or more wired and/or wireless networks. For example, core network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Customer network 250 may include one or more wired and/or wireless networks. For example, customer network 250 may include a cellular network (e.g., an LTE network, a 3G network, a CDMA network, etc.), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
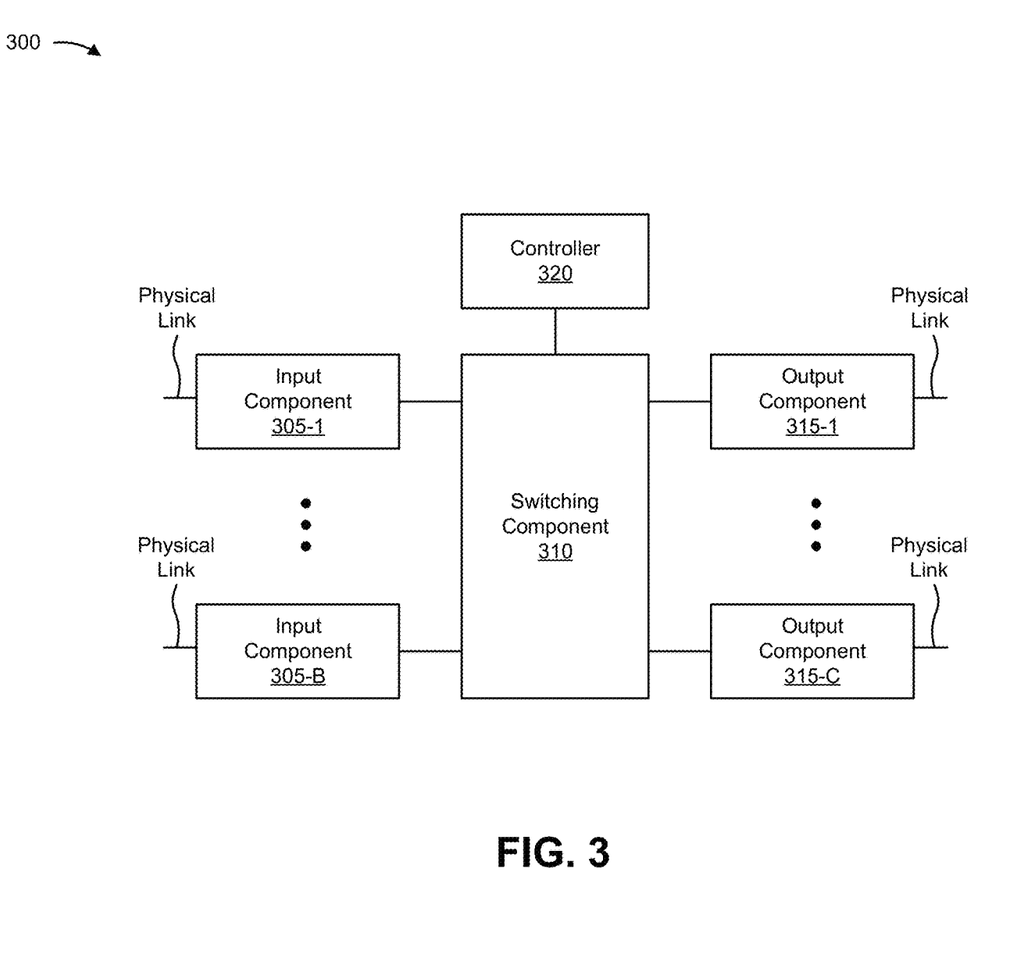
FIG. 3 is a diagram of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
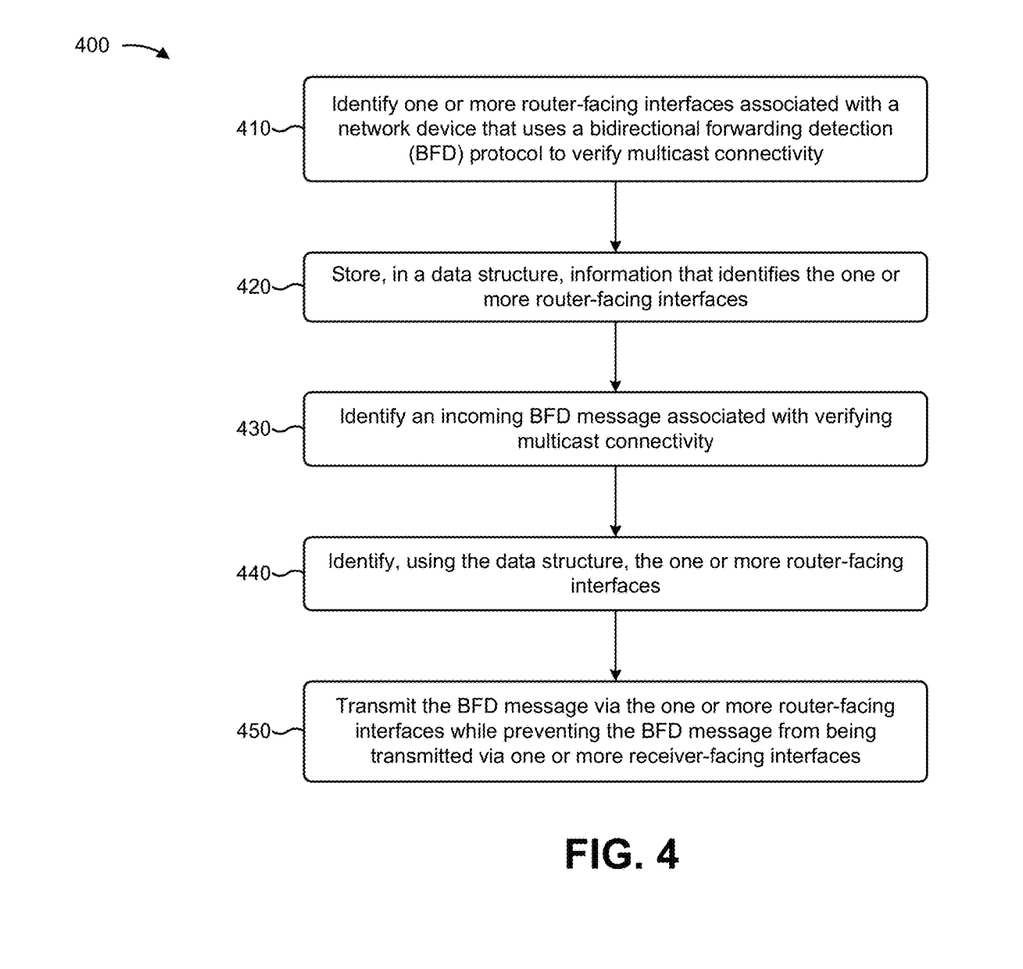
FIG. 4 is a flow chart of an example process for selective transmission of bidirectional forwarding detection (BFD) messages for verifying multicast connectivity.

FIG. 4 is a flow chart of an example process 400 for selective transmission of bidirectional forwarding detection (BFD) messages for verifying multicast connectivity. In some implementations, one or more process blocks of FIG. 4 may be performed by network device 220. In some implementations, one or more process blocks of FIG. 4 may be performed by another device or a group of devices separate from or including network device 220, such as multicast source device 210 and/or receiver device 230.

As shown in FIG. 4, process 400 may include identifying one or more router-facing interfaces associated with a network device that uses a bidirectional forwarding detection (BFD) protocol to verify multicast connectivity (block 410). For example, network device 220 may identify one or more router-facing interfaces, and network device 220 may use a bidirectional forwarding detection protocol to verify multicast connectivity. In some implementations, network device 220 may use a bidirectional forwarding detection protocol to verify multicast connectivity between a multipoint sender or head end and one or more multipoint receivers or tail ends. The multipoint sender and/or head end may be multicast source device 210. The multipoint receiver and/or tail end may be receiver device 230. In some implementations, network device 220 may receive and/or transmit bidirectional forwarding detection messages to assist with verifying multicast connectivity. The bidirectional forwarding detection messages may be control messages.

If network device 220 transmits a bidirectional forwarding detection message to another network device 220, the other network device 220 may be able to process the bidirectional forwarding detection message. However, if network device 220 transmits a bidirectional forwarding detection message to receiver device 230, receiver device 230 may not be able to process the bidirectional forwarding detection message. This may cause processing errors, network errors, interruption of the multicast stream, or the like, such as dropping the bidirectional forwarding detection message and/or sending a message to transmitting network device 220 indicating that receiver device 230 is not reachable. In some implementations, transmitting network device 220 may differentiate between network devices 220 and receiver devices 230 so as to transmit bidirectional forwarding detection messages only to network devices 220 and not to receiver devices 230. To accomplish this, network device 220 may identify one or more router-facing interfaces of network device 220. A router-facing interface may refer to an interface between a network device 220 and another network device 220. A receiver-facing interface may refer to an interface between network device 220 and receiver device 230.

In some implementations, network device 220 may receive a routing control message via an interface, and may identify the interface as a router-facing interface based on receiving the routing control message via the router-facing interface. A routing control message may be a message that is generated and/or transmitted by network devices 220, such as routers, switches, or the like, and not by receiver devices 230. For example, a routing control message may include a message used for a routing protocol. The routing protocol may be an interior gateway protocol, a link-state routing protocol, a distance-vector routing protocol, an exterior gateway protocol, a border gateway protocol, or the like. The routing protocol message may be an Internet Group Management Protocol (IGMP) Query message, a Protocol Independent Multicast (PIM) Hello message, or the like. In some implementations, network device 220 may identify the routing control messages by performing multicast snooping of Internet Group Management Protocol (IGMP) network traffic.

As further shown in FIG. 4, process 400 may include storing, in a data structure, information that identifies the one or more router-facing interfaces (block 420). For example, network device 220 may store, in a data structure, information that identifies the one or more router-facing interfaces. In some implementations, network device 220 may store information that identifies which interfaces of network device 220 are router-facing interfaces. For example, network device 220 may identify the interfaces that connect network device 220 to another network device 220. Additionally, or alternatively, network device 220 may store information that identifies which interfaces of network device 220 are receiver-facing interfaces, such as which interfaces of network device 220 connect network device 220 to a receiver device 230.

In some implementations, network device 220 may store information that identifies a state associated with an interface of network device 220. This may be the case where network device 220 is a Layer 2 network device, such as an Ethernet switch, for example. The state may indicate whether an interface is a router-facing interface or a receiver-facing interface.

In some implementations, network device 220 may store a multicast outgoing interface (OIF) list that identifies one or more interfaces via which network device 220 is to transmit multicast traffic. For example, when network device 220 is a Layer 3 network device, such as a router, network device 220 may store a multicast outgoing interface list that identifies one or more interfaces via which network device 220 is to transmit multicast traffic. In such a case, network device 220 may store a routing flag (e.g., a routing indicator) in association with an interface identifier, included in the outgoing interface list, that indicates whether the interface is a router-facing interface. The routing flag may indicate whether a next hop device is a router, such as a network device 220, or a receiver, such as a receiver device 230.

In some implementations, (e.g., when network device 220 is a Layer 3 network device, such as a router), network device 220 may store a routing table that identifies routes. In such a case, network device 220 may install (e.g., store) one or more routes for connections to network devices 220. For example, network device 220 may store information identifying routes for interfaces that are router-facing interfaces. The installed routes may identify a prefix (e.g., a mask) used to identify bidirectional forwarding detection messages, and may indicate where to route incoming packets that match the prefix. The routes may be associated with a rule for routing the bidirectional forwarding detection messages via the router-facing interfaces, to network devices 220, for example. In some implementations, the routing table may include a first, shorter prefix that identifies all multicast traffic, and a second, longer prefix that identifies bidirectional forwarding detection messages for the multicast traffic.

As shown in FIG. 4, process 400 may include identifying an incoming bidirectional forwarding detection message associated with verifying multicast connectivity (block 430). For example, network device 220 may identify an incoming bidirectional forwarding detection message associated with verifying multicast connectivity. In some implementations, network device 220 may receive incoming packets, and may apply a filter to the incoming packets to identify bidirectional forwarding detection messages (e.g., bidirectional forwarding detection packets) associated with verifying multicast connectivity. The filter may identify bidirectional forwarding detection messages based on one or more characteristics of a packet, such as 5-tuple information included in the packet (e.g., a source Internet protocol (IP) address, a destination IP address, a source port identifier, a destination port identifier, and/or a protocol identifier). As an example, the filter may determine that a network address identified in the packet (e.g., a destination IP address) matches a multicast group network address (e.g., a multicast group IP address), that a protocol identifier included in the packet indicates a universal datagram protocol (UDP), and that a port identifier (e.g., a destination port identifier) matches a port identifier associated with the bidirectional forwarding detection protocol.

In some implementations, network device 220 may store a general filter to route multicast traffic (e.g., non-bidirectional forwarding detection messages) to appropriate network devices 220 and receiver devices 230 subscribed to receive the multicast traffic. Additionally, or alternatively, network device 220 may store a specific filter to route bidirectional forwarding detection messages only to network devices 220, and not to receiver devices 230. As another example, network device 220 may use a prefix to identify whether the message is a bidirectional forwarding detection message.

As further shown in FIG. 4, process 400 may include identifying, using the data structure, the one or more router-facing interfaces (block 440). For example, network device 220 may identify, using the data structure, the one or more router-facing interfaces. In some implementations, network device 220 may determine one or more router-facing interfaces via which the received bidirectional forwarding detection message is to be transmitted. Network device 220 may determine one or more router-facing interfaces via which the received bidirectional forwarding detection message is to be transmitted using the data structure. For example, network device 220 may look up stored information that identifies states associated with interfaces, and may determine which interfaces are router-facing interfaces based on the states. Additionally, or alternatively, network device 220 may use routing flags stored in the outgoing interface list to determine which interfaces are router-facing interfaces. Additionally, or alternatively, network device 220 may determine that the message is a bidirectional forwarding detection message using a prefix, and may identify router-facing interfaces stored in association with the prefix in a routing table.

As further shown in FIG. 4, process 400 may include transmitting the bidirectional forwarding detection message via the one or more router-facing interfaces while preventing the bidirectional forwarding detection message from being transmitted via one or more receiver-facing interfaces (block 450). For example, network device 220 may transmit the bidirectional forwarding detection message via the one or more router-facing interfaces while preventing the bidirectional forwarding detection message from being transmitted via one or more receiver-facing interfaces. In some implementations, network device 220 may transmit the bidirectional forwarding detection message (e.g., to network devices 220) via the one or more router-facing interfaces. In this way, network device 220 may prevent bidirectional forwarding detection messages from being transmitted to receiver devices 230 via receiver-facing interface(s) of network device 220. Because receiver devices 230 may not be configured to correctly process bidirectional forwarding detection messages, network device 220 may reduce processing errors, network errors, multicast transmission errors, or the like.

In some implementations, network device 220 may include a loopback interface (e.g., a logical and/or virtual interface that does not connect to any hardware or network) to assist with reporting multicast connectivity issues. The loopback interface may be an interface that is available even if physical interfaces of network device 220 are not available. The loopback interface may permit communication between network devices 220, such as to report multicast connectivity issues, when other interfaces of network device 220 are unavailable (e.g., which may be a cause of the multicast connectivity issues).

In some implementations, network device 220 may be configured to enable or disable selective routing of bidirectional forwarding detection messages, such as routing of bidirectional forwarding detection messages only via router-facing interfaces. For example, in some cases, one or more receiver devices 230 may be configured to process bidirectional forwarding detection messages (e.g., for an application-to-application bidirectional forwarding detection session). In this case, network device 220 may be configured to disable selective routing of bidirectional forwarding detection messages (e.g., based on receiving an instruction to disable selective routing of bidirectional forwarding detection messages).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit a network device to differentiate between router-facing interfaces of the network device and receiver-facing interfaces of the network device, which permits the network device to selectively route bidirectional forwarding detection messages to network devices and not to receiver devices. This selective routing of bidirectional forwarding detection messages may reduce processing errors, network errors, and multicast transmission errors.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
a memory; and one or more processors to:
identify one or more first interfaces used by the network device to communicate with one or more other network devices,
the network device using one or more second interfaces to communicate with one or more multicast receiver devices that are different from the one or more other network devices;
store information that identifies the one or more first interfaces used to communicate with the one or more other network devices and the one or more second interfaces used to communicate with the one or more multicast receiver devices,
each first interface, of the one or more first interfaces, including:
a router-facing interface, associated with a route based on a prefix, and
identified by a routing flag,
the routing flag stored in association with an interface identifier stored in a multicast outgoing interface list,
the routing flag indicating that an interface, identified by the interface identifier and included in the one or more first interfaces, is to communicate with another network device of the one or more other network devices, and
each second interface, of the one or more second interfaces, including a receiver-facing interface;
receive a packet;
determine that the packet includes a bidirectional forwarding detection message, associated with a bidirectional forwarding detection protocol, to be used to verify multicast connectivity with a multicast source device;
identify the one or more first interfaces based on the stored information and based on determining that the packet includes the bidirectional forwarding detection message; and
transmit the packet via the one or more first interfaces without transmitting the packet via the one or more second interfaces.

2. The network device of claim 1, where the network device includes a traffic transfer device to transfer multicast traffic, received from the multicast source device, to the one or more other network devices and the one or more multicast receiver devices.

3. The network device of claim 1, where the one or more other network devices include one or more traffic transfer devices to transfer multicast traffic received from the multicast source device; and
where the one or more multicast receiver devices are subscribed to receive multicast traffic from the multicast source device.

4. The network device of claim 1, further comprising a loopback interface used by the network device to report multicast connectivity issues.

5. The network device of claim 1, where the one or more processors, when storing the information that identifies the one or more first interfaces, are to:
store information that identifies a state of an interface included in the one or more first interfaces,
the state indicating that the interface is used to communicate with another network device, of the one or more other network devices, rather than with a multicast receiver device of the one or more multicast receiver devices.

6. The network device of claim 1, where the one or more processors, when storing the information that identifies the one or more first interfaces, are to:
store, in a routing table, the route that include a rule for routing the bidirectional forwarding detection message via the one or more first interfaces.

7. The network device of claim 1, where the one or more processors are further to:
store, in a routing table, the prefix;
identify the prefix in the packet; and
where the one or more processors, when identifying the one or more first interfaces, are to:
identify the one or more first interfaces based on the routing table and based on identifying the prefix in the packet.

8. A non-transitory computer-readable medium storing instructions, the instructions comprising:
one or more instructions that, when executed by one or more processors, cause the one or more processors to:
identify one or more first interfaces used by a network device to communicate with one or more other network devices,
the network device using one or more second interfaces to communicate with one or more multicast receiver devices that are different from the one or more other network devices;
store information that identifies the one or more first interfaces used to communicate with the one or more other network devices and the one or more second interfaces used to communicate with the one or more multicast receiver devices,
each first interface, of the one or more first interfaces, including:
a router-facing interface, associated with a route based on a prefix, and
identified by a routing flag,
the routing flag stored in association with an interface identifier stored in a multicast outgoing interface list,
the routing flag indicating that an interface, identified by the interface identifier and included in the one or more first interfaces, is to communicate with another network device of the one or more other network devices, and
each second interface of the one or more second interfaces, including a receiver-facing interface;
determine that a packet includes a bidirectional forwarding detection message, associated with a bidirectional forwarding detection protocol, to be used to verify multicast connectivity with a multicast source device; and
transmit, based on the stored information, the packet via the one or more first interfaces without transmitting the packet via the one or more second interfaces.

9. The non-transitory computer-readable medium of claim 8, where the one or more instructions, that cause the one or more processors to store the information that identifies the one or more first interfaces, cause the one or more processors to:
store information that identifies a state of an interface included in the one or more first interfaces,
the state indicating that the interface is used to communicate with another network device, of the one or more other network devices, rather than with a multicast receiver device of the one or more multicast receiver devices.

10. The non-transitory computer-readable medium of claim 8, where the one or more instructions, that cause the one or more processors to store the information that identifies the one or more first interfaces, cause the one or more processors to:
  store, in a routing table, the route that include a rule for routing the bidirectional forwarding detection message via the one or more first interfaces.

11. The non-transitory computer-readable medium of claim 8, where the one or more instructions, when executed by the one or more processors, further cause the one or more processors to:
  store, in a routing table, the prefix;
  store, in the routing table, information that identifies the one or more first interfaces without storing information that identifies the one or more second interfaces; and
  where the one or more instructions, that cause the one or more processors to transmit the packet via the one or more first interfaces without transmitting the packet via the one or more second interfaces, cause the one or more processors to:
    transmit the packet based on the routing table.

12. The non-transitory computer-readable medium of claim 8, where the one or more instructions, that cause the one or more processors to determine that the packet includes the bidirectional forwarding detection message, cause the one or more processors to:
  determine that the packet includes the bidirectional forwarding detection message based on a multicast network address included in the packet and based on at least one of:
    a protocol identifier included in the packet, or
    a port identifier included in the packet.

13. The non-transitory computer-readable medium of claim 8, where the one or more instructions, that cause the one or more processors to determine that the packet includes the bidirectional forwarding detection message, cause the one or more processors to:
  determine that the packet includes a multicast group network address;
  determine that the packet includes a protocol identifier that identifies a universal datagram protocol;
  determine that the packet includes a port identifier that identifies a port used for bidirectional forwarding detection messages; and
  determine that the packet includes the bidirectional forwarding detection message based on determining that the packet includes the multicast group network address, the protocol identifier, and the port identifier.

14. The non-transitory computer-readable medium of claim 8, where the network device and the other network devices include a set of traffic transfer devices to transfer multicast traffic, received from the multicast source device, to the one or more multicast receiver devices.

15. A method, comprising:
  receiving, by a first network device, a packet;
  determining, by the first network device, that the packet includes a bidirectional forwarding detection message, associated with a bidirectional forwarding detection protocol, to be used to verify multicast connectivity with a multicast source device;
  identifying, by the first network device, one or more first interfaces and one or more second interfaces based on determining that the packet includes the bidirectional forwarding detection message,
  the one or more first interfaces to be used by the first network device to communicate with one or more second network devices,
  each first interface, of the one or more first interfaces, including:
    a router-facing interface, associated with a route based on a prefix, and
    identified by a routing flag,
      the routing flag stored in association with an interface identifier stored in a multicast outgoing interface list,
      the routing flag indicating that an interface, identified by the interface identifier and included in the one or more first interfaces, is to communicate with another network device of the one or more second network devices, and
  each second interface, of one or more second interfaces, including a receiver-facing interface, and
  the one or more second interfaces to be used by the first network device to communicate with one or more multicast receiver devices that are different from the one or more second network devices; and
  transmitting, by the first network device and based on identifying the one or more first interfaces, the packet via the one or more first interfaces without transmitting the packet via the one or more second interfaces.

16. The method of claim 15, where identifying the one or more first interfaces comprises:
  identifying the one or more first interfaces based on information stored in association with at least one of:
    one or more states corresponding to the one or more first interfaces,
    a multicast outgoing interface list, or
    a routing table.

17. The method of claim 15, further comprising:
  storing, in a routing table, the prefix;
  identifying the prefix in the packet; and
  where identifying the one or more first interfaces comprises:
    identifying the one or more first interfaces based on the routing table and based on identifying the prefix in the packet.

18. The method of claim 15, where determining that the packet includes the bidirectional forwarding detection message comprises:
  determining that the packet includes a multicast network address;
  determining that the packet includes a protocol identifier that identifies a protocol used to transmit bidirectional forwarding detection messages;
  determining that the packet includes a port identifier that identifies a port used for bidirectional forwarding detection messages; and
  determining that the packet includes the bidirectional forwarding detection message based on determining that the packet includes the multicast network address, the protocol identifier, and the port identifier.

19. The method of claim 15, where the first network device and the one or more second network devices include a set of traffic transfer devices to transfer multicast traffic, received from the multicast source device, to the one or more multicast receiver devices.

20. The method of claim 15, where the one or more multicast receiver devices are subscribed to receive multicast traffic from the multicast source device.

* * * * *